(12) United States Patent
Shiraishi et al.

(10) Patent No.: US 8,807,819 B2
(45) Date of Patent: Aug. 19, 2014

(54) ILLUMINATION UNIT AND DISPLAY APPARATUS USING THE SAME

(75) Inventors: Mikio Shiraishi, Yokohama (JP); Masayuki Tanabe, Fujisawa (JP); Mika Tanimura, Yokohama (JP); Shoji Yamamoto, Fujisawa (JP); Kenji Takano, Nagaoka (JP); Yoshifumi Shimane, Machida (JP); Yasuaki Ohara, Yokohama (JP); Reiji Nakamura, Ichinomiya (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/567,762

(22) Filed: Aug. 6, 2012

(65) Prior Publication Data
US 2013/0050990 A1 Feb. 28, 2013

(30) Foreign Application Priority Data
Aug. 26, 2011 (JP) .................. 2011-184273

(51) Int. Cl.
*F21V 7/04* (2006.01)
(52) U.S. Cl.
USPC ............... 362/617; 362/618; 362/620
(58) Field of Classification Search
USPC ........... 362/601, 606, 611, 612, 613, 617, 18, 362/619, 620; 349/61–64
See application file for complete search history.

(56) References Cited

U.S. PATENT DOCUMENTS

| | | | | |
|---|---|---|---|---|
| 7,139,048 B2 * | 11/2006 | Han et al. | ......................... | 349/62 |
| 7,204,632 B2 * | 4/2007 | Chen | .............................. | 362/613 |
| 7,357,552 B2 * | 4/2008 | Takada | ........................... | 362/608 |
| 7,468,710 B2 * | 12/2008 | Nakaoka | ......................... | 345/32 |
| 8,317,386 B2 * | 11/2012 | Nagata et al. | ................. | 362/611 |
| 2006/0215386 A1 | 9/2006 | Hatanaka et al. | | |
| 2011/0012942 A1 | 1/2011 | Kim et al. | | |
| 2012/0026753 A1 | 2/2012 | Shiraishi et al. | | |

FOREIGN PATENT DOCUMENTS

| | | |
|---|---|---|
| CN | 1523426 A | 8/2004 |
| CN | 1853068 A | 10/2006 |
| CN | 101939695 A | 1/2011 |
| JP | 2003-242817 A | 8/2003 |
| JP | 2005-117023 A | 4/2005 |
| JP | 2012-033420 A | 2/2012 |

OTHER PUBLICATIONS

Patent Office of the People's Republic of China, Notification of First Office Action on application No. 201210277321.7 mailed Mar. 4, 2014; 10 pages.

* cited by examiner

*Primary Examiner* — Ali Alavi
(74) *Attorney, Agent, or Firm* — Foley & Lardner LLP

(57) ABSTRACT

An illumination unit of the present invention includes a tabular light guide plate having a light emitting surface for emitting light coming from an LED as planar light, wherein a recessed portion is formed in the opposite surface of the light emitting surface of the light guide plate, and wherein the LED is provided in the recessed portion so that the optical axis of the LED becomes parallel to the light emitting surface of the light guide plate. Then, a dimming pattern is provided at a location corresponding to the LED of the light emitting surface of the light guide plate, and the dimming pattern includes a main portion covering the LED on the light emitting surface side, and protrusions radially extending toward a light emitting direction of the LED around the LED.

15 Claims, 18 Drawing Sheets

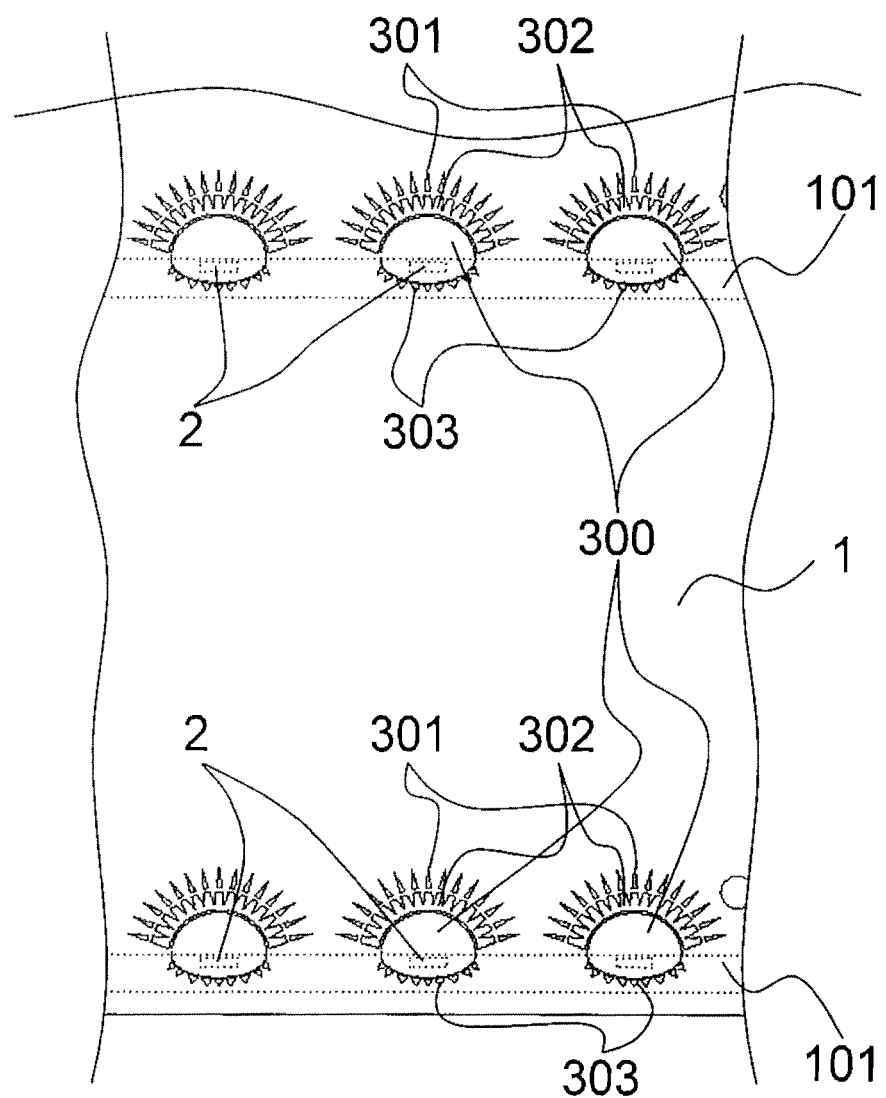

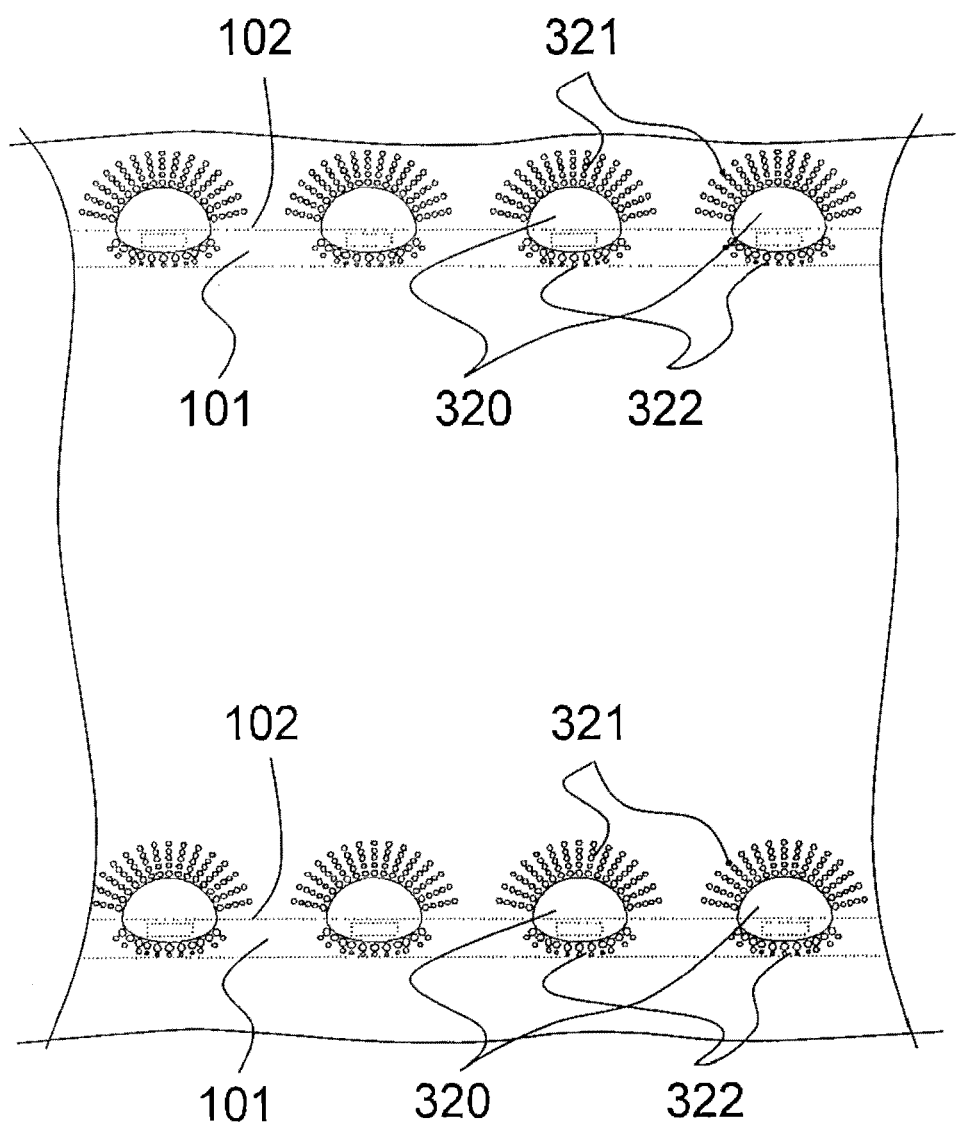

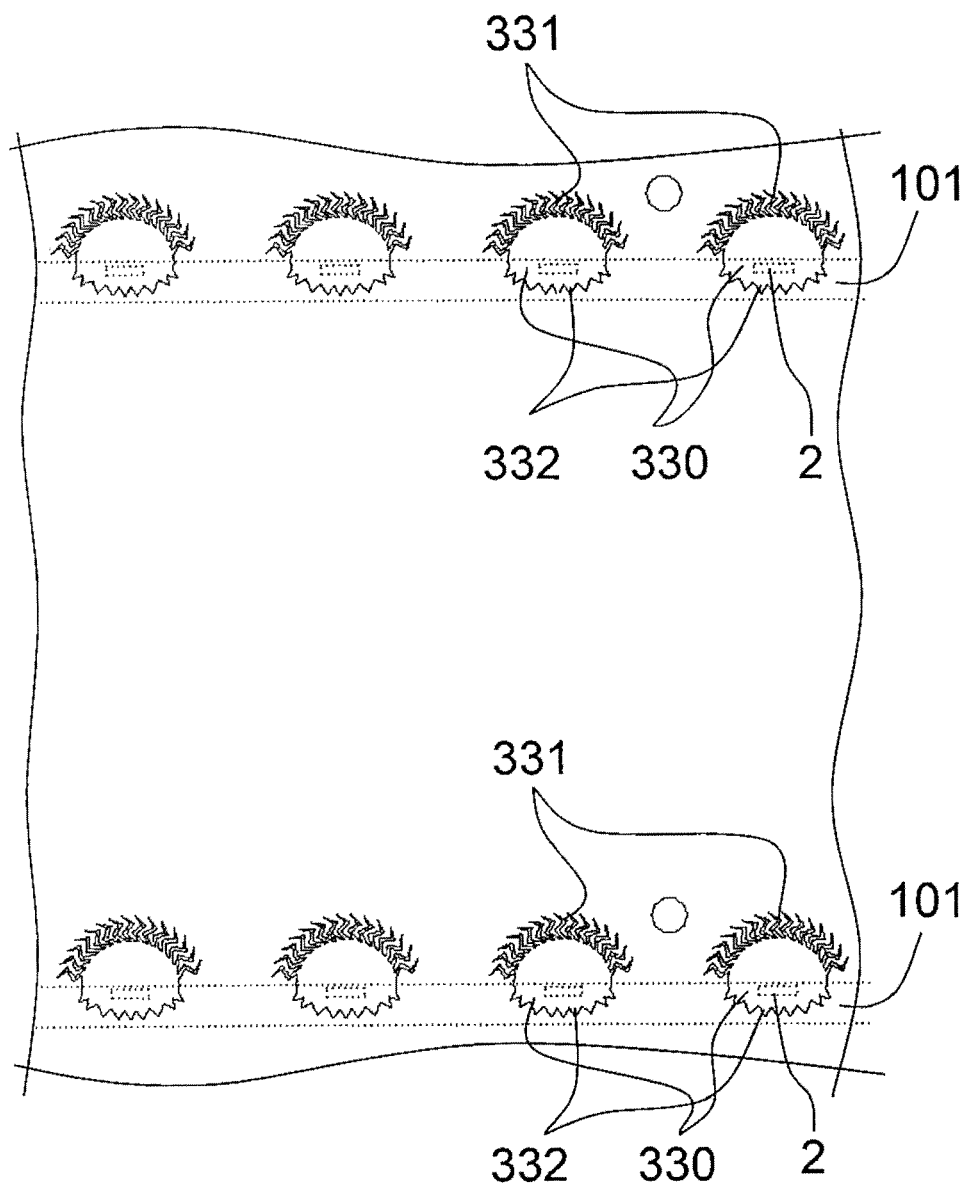

ILLUMINATION UNIT AND DISPLAY APPARATUS USING THE SAME

INCORPORATION BY REFERENCE

The present application claims priority from Japanese application JP2011-184273 filed on Aug. 26, 2011, the content of which is hereby incorporated by reference into this application. The contents of Japanese applications JP2011-184274 filed on Aug. 26, 2011 and JP2011-184271 filed on Aug. 26, 2011 are also hereby incorporated by reference into this application.

BACKGROUND OF THE INVENTION

The present invention relates to an illumination unit using an LED (Light Emitting Diode) as a light source, and to a display apparatus using the same as a back light.

The illumination unit using LEDs, i.e., light emitting elements, as a light source is used as a back light of a display apparatus with a transmission type display device, such as a liquid crystal display panel (LCD), and is widely put into practical use.

As the configuration of the illumination unit used as a back light, a configuration using an LED as a light source and a light guide plate for guiding the light emitted from the LED to an LCD side as a surface light source is known.

In such configuration, the light incoming from the light source travels inside the light guide plate by total internal reflection or the like, and is scattered by a diffusion/light-guide pattern provided on the surface of the light guide plate, and is extracted from the surface of the light guide plate. At this time, in the vicinity of the light source (the vicinity of the light incident portion) of the light guide plate, the intensity of light locally increases as compared with other portions and the so-called uneven brightness is generated. As a conventional art for reducing such uneven brightness, it is known that a light shielding member or a light reflective/absorbing member is provided in the vicinity of a light source of the surface of a light guide plate, as described, for example, in JP-A-2005-117023 and JP-A-2003-242817.

SUMMARY OF THE INVENTION

An LED has a light emission characteristic that light radially spreads around the center (optical axis) of its lighting surface. Here, the optical axis is an axis extending from the center of the light emitting surface of an LED to a direction perpendicular to the light emitting surface. For example, in the case where an LED is a side view type LED whose light emitting direction is parallel to an electrode surface, when this side view type LED is seen from above (from the upper side), light is emitted so as to radially spread, around the optical axis, forwardly from the lighting surface side.

In the above-described conventional art, the light shielding member or the light reflective/absorbing member provided in the light guide plate does not have a configuration taking into consideration the above-described light emission characteristic of the LED. Therefore, in the conventional art, it is difficult to suitably reduce such an uneven brightness that the light intensity locally increases in the vicinity of the LED, as described above.

Moreover, in the case where a light source is configured by arranging a plurality of LEDs in a predetermined direction, the light emitted from an LED does not sufficiently reach a portion between the LEDs, and therefore the portion between the LEDs becomes a dark portion that is locally dark, causing uneven brightness. The above-described conventional art neither consider the uneven brightness caused by such dark portion between the LEDs.

The present invention has been made in view of the above-described problem of the conventional art, and provides a technique suitable in reducing the uneven brightness in an illumination unit using LEDs as a light source and a display apparatus using the same.

The present invention is characterized by the configurations as set forth in the claims.

More specifically, according to an aspect of the present invention, an illumination unit comprises: light emitting elements (LEDs) as a light source; and a tabular light guide plate having a light emitting surface for emitting light from the light source as planar light, wherein a recessed portion is formed in an opposite surface of the light emitting surface of the light guide plate, and wherein the light emitting element is provided in the recessed portion so that an optical axis of the light emitting element becomes parallel to the light emitting surface of the light guide plate. Here, a dimming pattern is provided at a portion positionally corresponding to the light emitting element of the light emitting surface of the light guide plate, and the dimming pattern includes an elliptic portion proximate to the light emitting element and protrusions radially extending around the light emitting element.

According to the present invention, in an illumination unit using LEDs as a light source and a display apparatus using the same, an effect of suitably reducing uneven brightness can be obtained.

Other objects, features and advantages of the invention will become apparent from the following description of the embodiments of the invention taken in conjunction with the accompanying drawings.

BRIEF DESCRIPTION OF THE DRAWINGS

FIGS. 10A and 10B are views illustrating a second embodiment of the present invention.

FIGS. 12A and 12B are views illustrating a fourth embodiment of the present invention.

FIGS. 13A and 13B are views illustrating a fifth embodiment of the present invention.

DETAILED DESCRIPTION OF THE EMBODIMENTS

Figure 1:
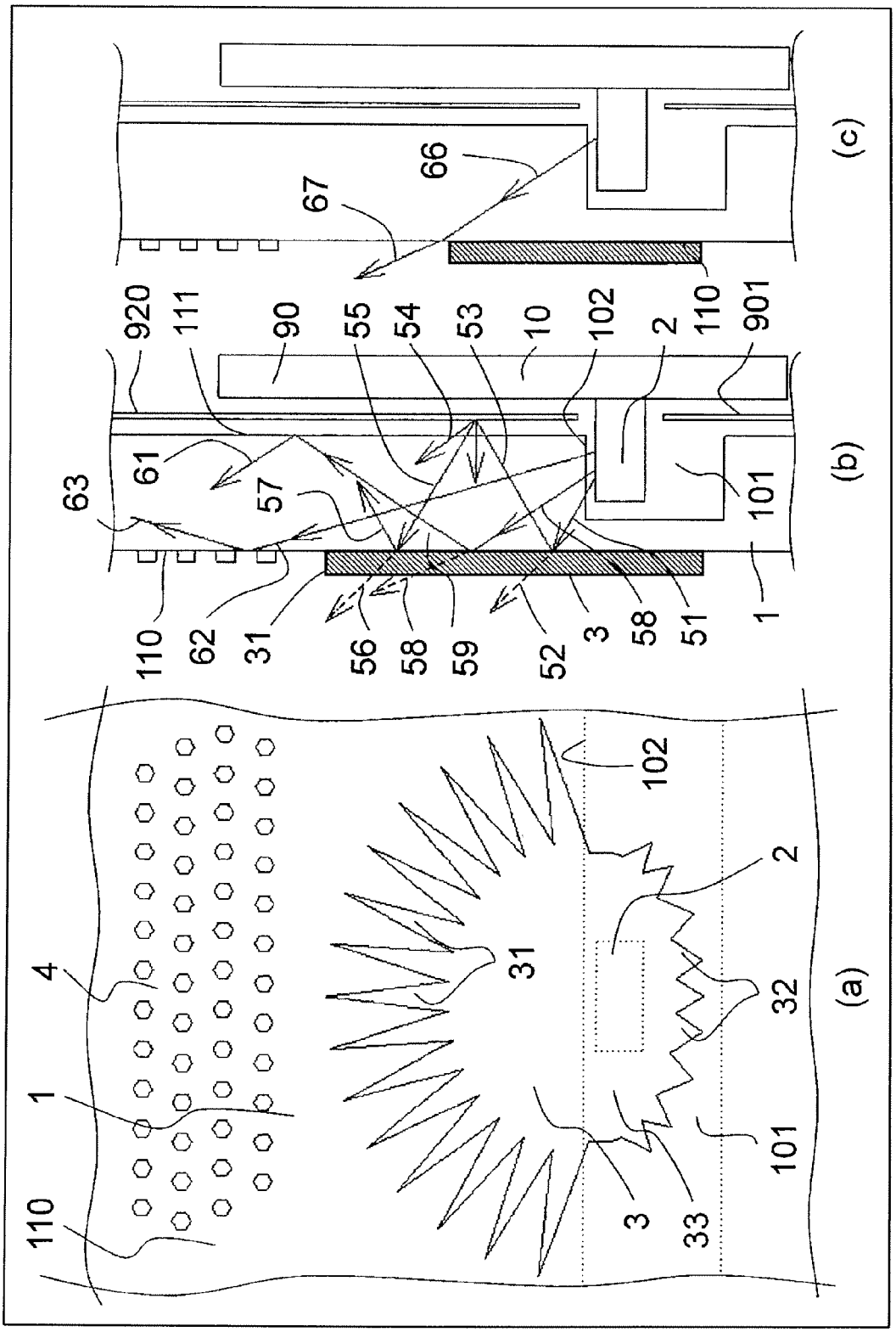
FIG. 1 is a view illustrating a dimming pattern portion and its periphery according to a first embodiment of the present invention.

Hereinafter, the embodiments of the present invention will be described with reference to the accompanying drawings. Note that, in each view or each embodiment, the same reference numeral is assigned to an element having the same configuration, function, or effect, and repeated explanation thereof is omitted.

Embodiment 1

FIG. 1 is a view for illustrating a dimming pattern 3 and a light guide pattern 4 of a light guide plate 1 and the functions thereof according to a first embodiment of the present invention. The embodiment is characterized in that the dimming pattern 3 with a radial protrusion, e.g., a chestnut-shaped dimming pattern 3, is provided at a portion positionally corresponding to an LED 2 (provided directly above an LED 2) of a light emitting surface 110 of the light guide plate 1 that converts the light from the LED 2 being a light emitting element, to planar light and emits the same. Moreover, the light guide pattern 4 comprising a collection of dots is formed with a predetermined spacing in a light emitting direction of the LED 2 of the dimming pattern 3. The detail of the embodiment is described later. First, detailed description of a display apparatus and an illumination unit, to which the embodiment is applied, is provided referring to FIG. 2 to FIG. 6.

Figure 2:
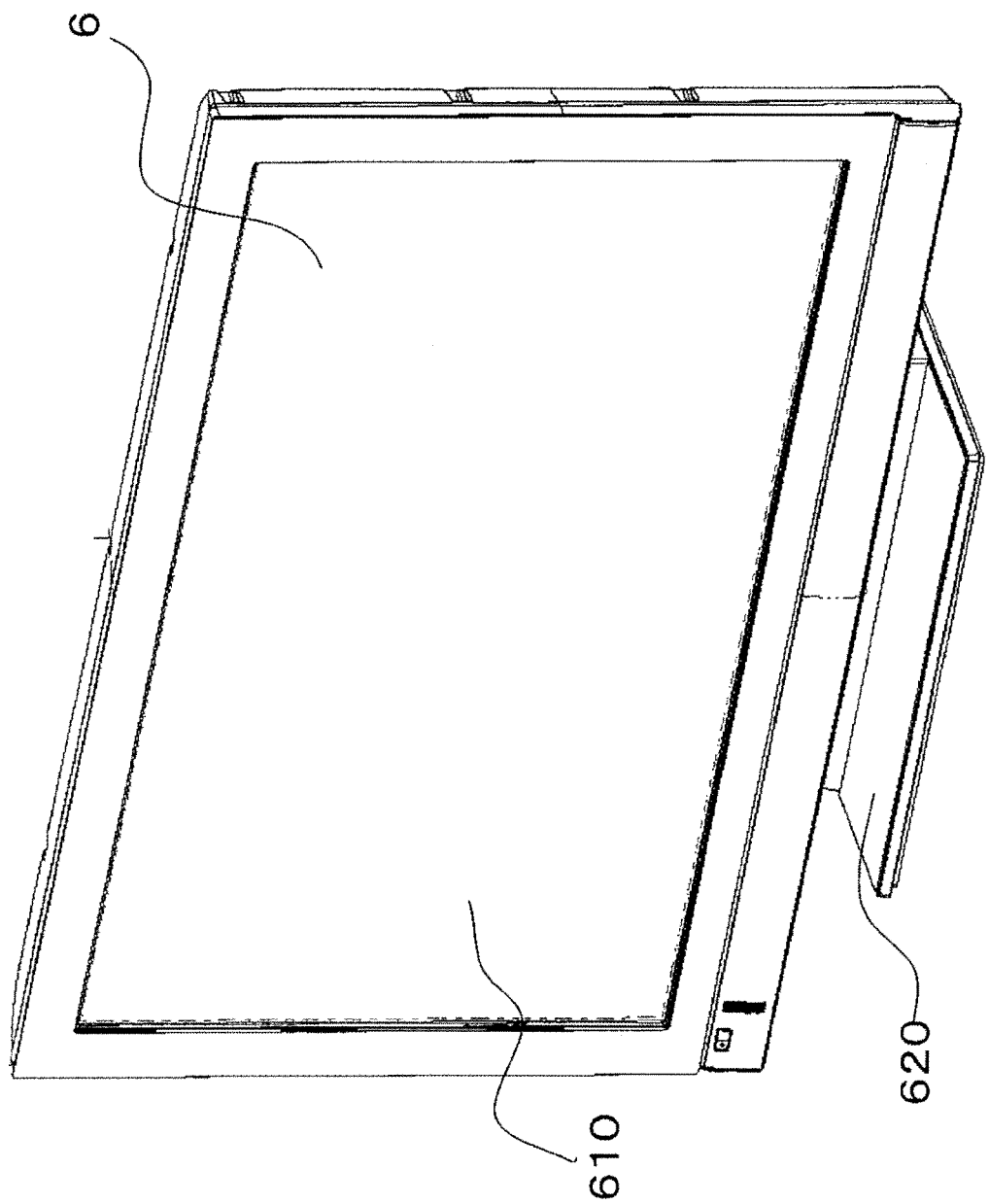
FIG. 2 is a perspective view illustrating an exemplary external view of a display apparatus 6 to which the present invention is applied.

FIG. 2 is a perspective view illustrating an exemplary external view of a display apparatus to which the present invention is applied. In FIG. 2, as an example of the display apparatus, a form of a television set is taken as an example.

In FIG. 2, the display apparatus 6 is a liquid crystal display apparatus using a liquid crystal display panel, and comprises a display unit 610 and a stand unit 620 supporting the display unit 610 from thereunder. Inside the display unit 610, as described later, the liquid crystal display panel that is a display device and an illumination unit are provided.

Figure 3:
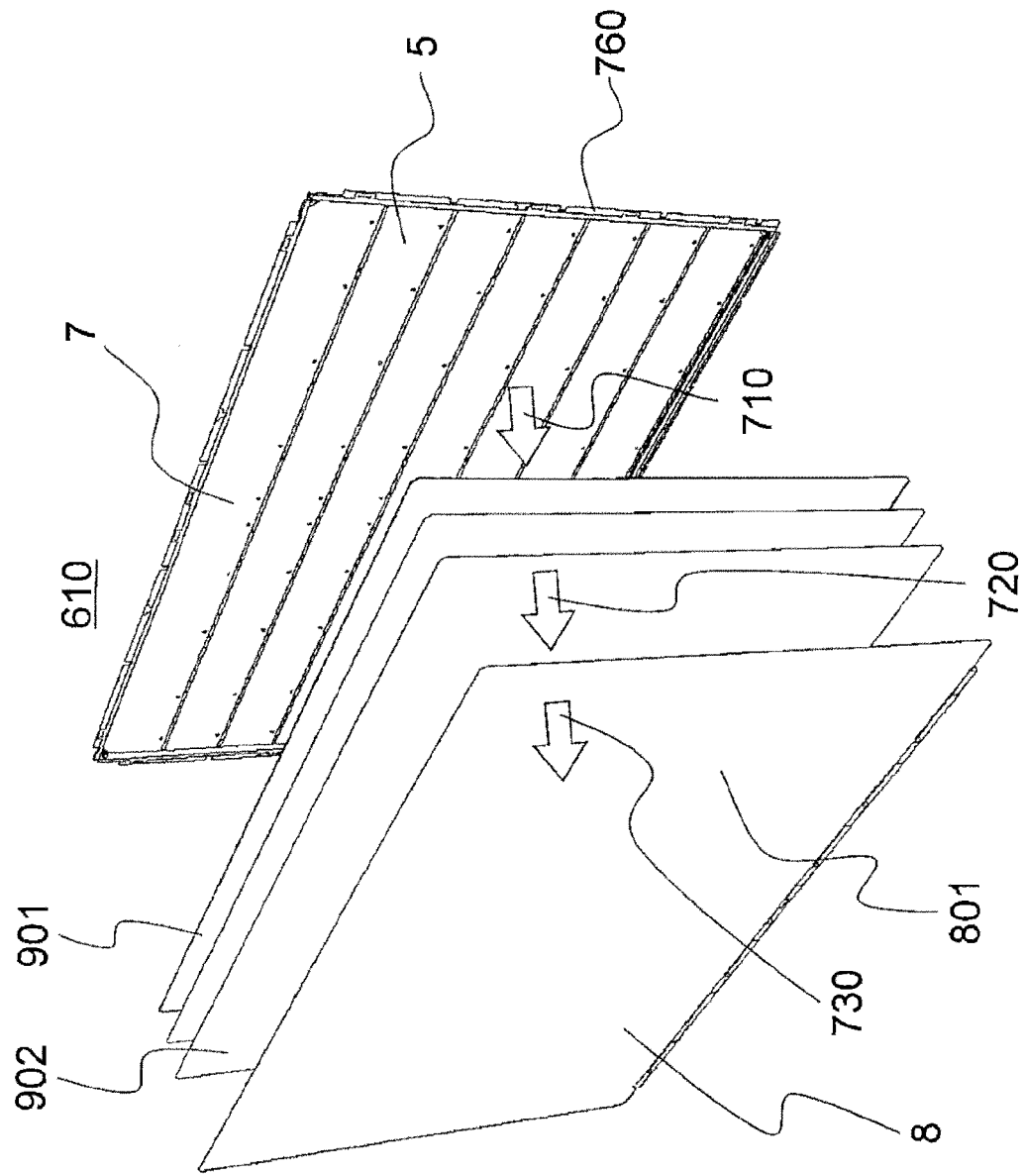
FIG. 3 is an exploded perspective view illustrating an example of the arrangement of main components in a display unit 610 illustrated in FIG. 2.

FIG. 3 is an exploded perspective view illustrating an example of the arrangement of main components in the display unit 610 of the display apparatus 6 illustrated in FIG. 2.

In FIG. 3, the main parts constituting the display apparatus 6 are a liquid crystal display panel (liquid crystal cell) 8 and an illumination unit 7 that is a back light for radiating light from the rear surface of the liquid crystal display panel 8. Here, light exiting from the illumination unit 7 travels as shown by an arrow 710, and reaches the liquid crystal display panel 8 through a diffuser 901, a prism sheet 902, and the like as shown by an arrow 720. A video signal is supplied to the liquid crystal display panel 8, and the light transmittance of a liquid crystal element constituting each pixel is controlled based on this video signal. Then, light that is incident upon the liquid crystal display panel 8 as shown by the arrow 720 is spatially modulated by each pixel of the liquid crystal display panel 8 to form an optical image, which is displayed on a light emitting surface 801 as an image. That is, light incident upon the liquid crystal display panel 8 is emitted as image light as shown by an arrow 730.

The illumination unit 7 comprises a single sub-illumination unit 5 or a combination of a plurality of sub-illumination units 5, and is attached to a lower chassis 760 constituting the whole illumination unit 7 and held.

The internal configuration of the sub-illumination unit 5 continues to be described with reference to FIG. 4. In (a) of FIG. 4, a plurality of LEDs 2 are attached to the light guide plate 1 via the illumination board 10 so as to be arranged with a predetermined spacing along a predetermined direction. Here, the LED 2 is provided so that the light emitting direction thereof becomes a direction parallel to the light emitting surface 110 of the light guide plate 1, i.e., so that the optical axis of the LED 2 becomes parallel to the light emitting surface 110 of the light guide plate 1. Light emitted from the LED 2 is incident upon a light incident surface 102 of the light guide plate 1 and travels inside the light guide plate 1, and is appropriately radiated from the light emitting surface 110 of the light guide plate 1, and reaches the liquid-crystal panel cell 8 via the diffuser 901, the prism sheet 902, and the like. Here, in the embodiment, the LED 2 is a side view type LED, and emits white light. With the use of the side view type LED, just by attaching the LED 2 to the illumination board 10, the light emitting direction of the LED 2 becomes a direction parallel to the light emitting surface 110 of the light guide plate 1.

In the embodiment, a recessed portion 101 is formed in a surface (hereinafter, in some cases referred to as a rear surface) on the opposite side of the light emitting surface 110 of the light guide plate 1, and the LED 2 is arranged in the recessed portion 101 formed in the rear surface of the light guide plate 1. Here, the recessed portion 101 comprises a groove which, in the embodiment, extends in the horizontal direction (the depth direction of the plane of the view, equal to the horizontal direction (lateral direction) of the liquid crystal display panel 8) of the light guide plate 1, and therefore hereinafter this recessed portion will be referred to as a groove portion. This groove portion is formed continuously in the horizontal direction of the light guide plate 1. One side of the groove portion 101 is the light incident surface 102 described above, and light emitted from the LED 2 is captured into the light guide plate 1 from the light incidence surface 102 that is one side of the groove portion 101.

Figure 4:
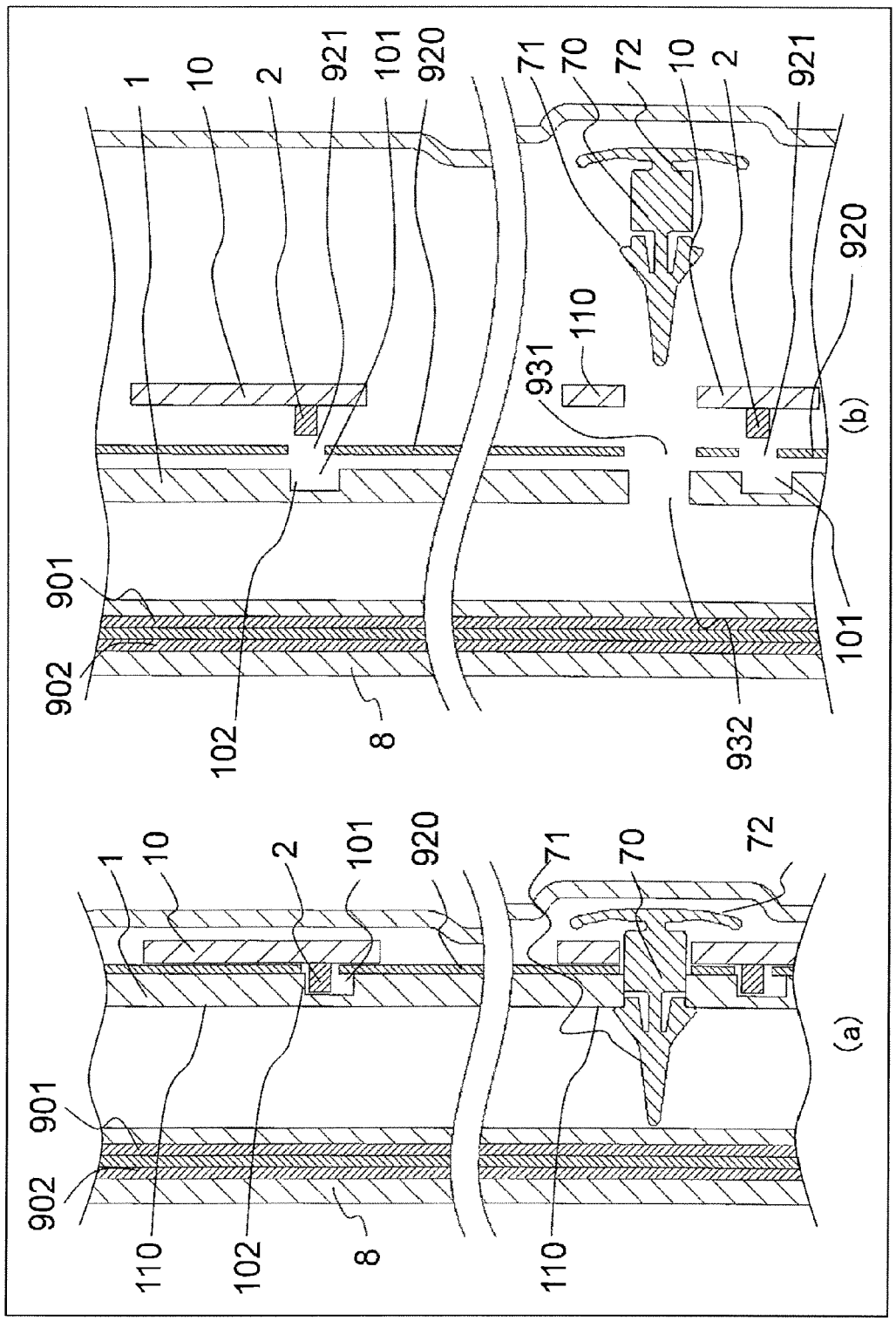
FIG. 4 is a cross sectional view illustrating a configuration example of an illumination unit 5 illustrated in FIG. 3.

(B) of FIG. 4 illustrates an exploded view of the illumination unit 5. A reflective sheet 920 is provided between the light guide plate 1 and the illumination board 10 on which the LED 2 is mounted. That is, the reflective sheet 920 is sandwiched and held by the rear surface of the light guide plate 1 and the illumination board 10 so as to be arranged on the rear side of the light guide plate 1. By means of the reflective sheet 920, light transmitting to the outside from the rear side of the light guide plate 1 is reflected and returned into the light guide plate 1. This improves the light use efficiency. Then, the LED 2 is exposed from an LED hole 921 provided in the reflective sheet 920, and the light emission portion of the LED 2 is inserted into the groove portion 101 of the light guide plate 1. A holding structure of the illumination board 10 with respect to the light guide plate 1 is attached using a pin mould 70 projecting in the thickness direction of the light guide plate 1 and having a tapered shape toward the liquid crystal display panel 8 side. In the embodiment, the pin mould 70 comprises resin and has a predetermined elasticity, and furthermore includes a front claw 71 and a back claw 72. Then, the pin mould 70 extends through an illumination board hole 930, a reflective sheet hole 931, and a light guide plate hole 932, and then sandwiches and holds the illumination board 10, the reflective sheet 920, and the light guide plate 1 by the front claw 71 and the back claw 72.

Figure 5:
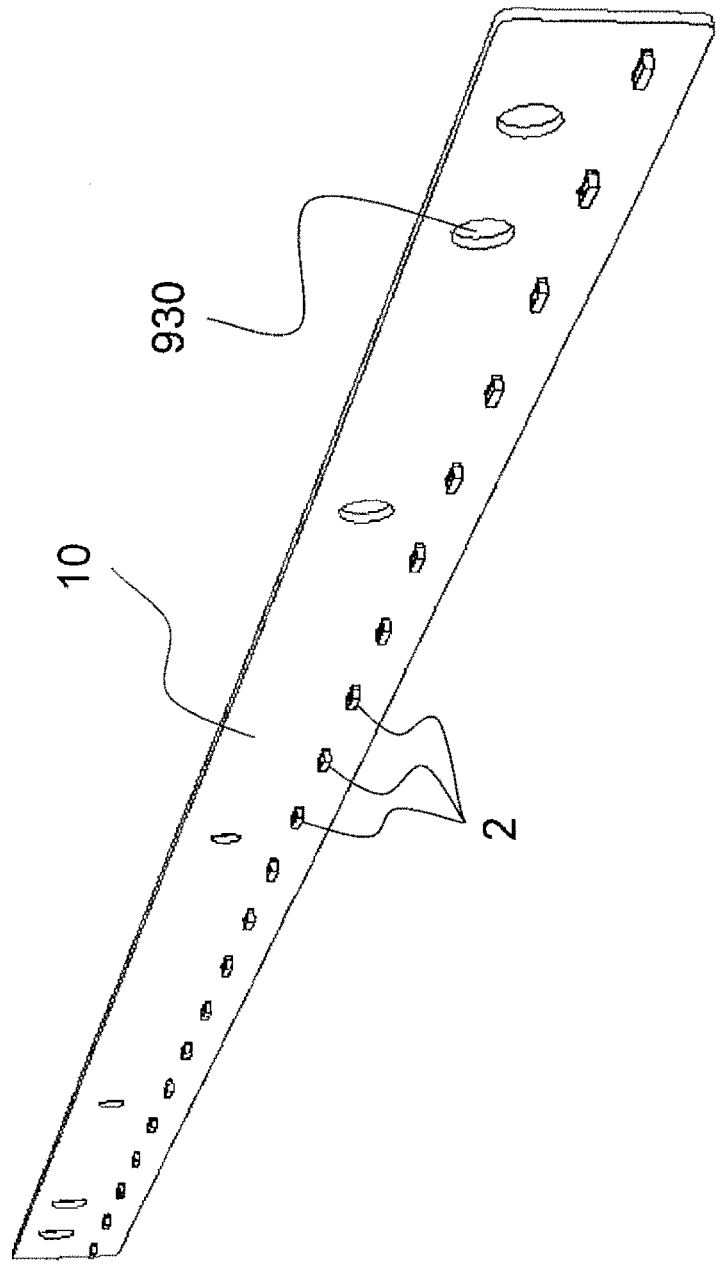
FIG. 5 is a perspective view illustrating a configuration example of an illumination board 10 illustrated in FIG. 4.

FIG. 5 is a perspective view illustrating a configuration example of the illumination board 10. As illustrated in FIG. 5, the illumination board 10 has a rectangular shape with the horizontal direction of the light guide plate 1 as the longer direction. A plurality of LEDs 2 are arranged with a predetermined spacing along the longer direction of the illumination board 10, and are attached to the illumination board 10 by soldering or the like. Moreover, a plurality of illumination board holes 930 are provided in the illumination board 10, and as with the description of FIG. 4 the pin mould 70 is inserted thereinto and attached and secured to the light guide plate 1.

Figure 6A:
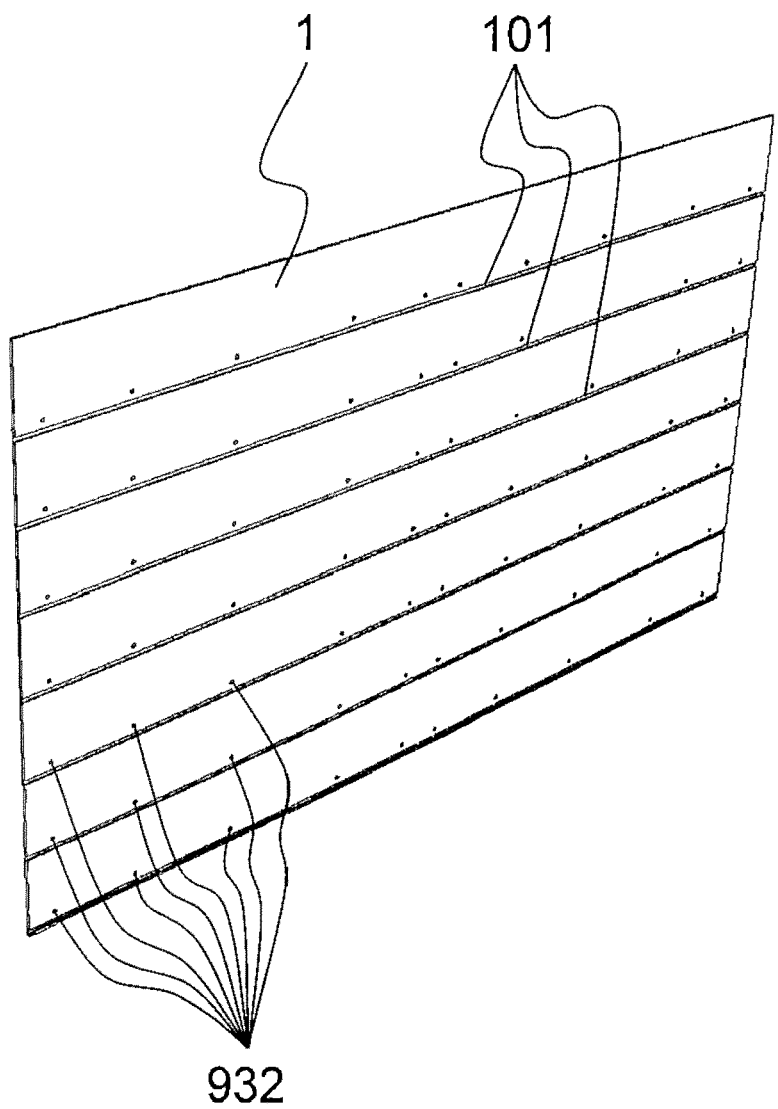
FIGS. 6A and 6B are perspective views illustrating an example of the outer shape of a light guide plate 1 used in an embodiment of the present invention.
Figure 6B:
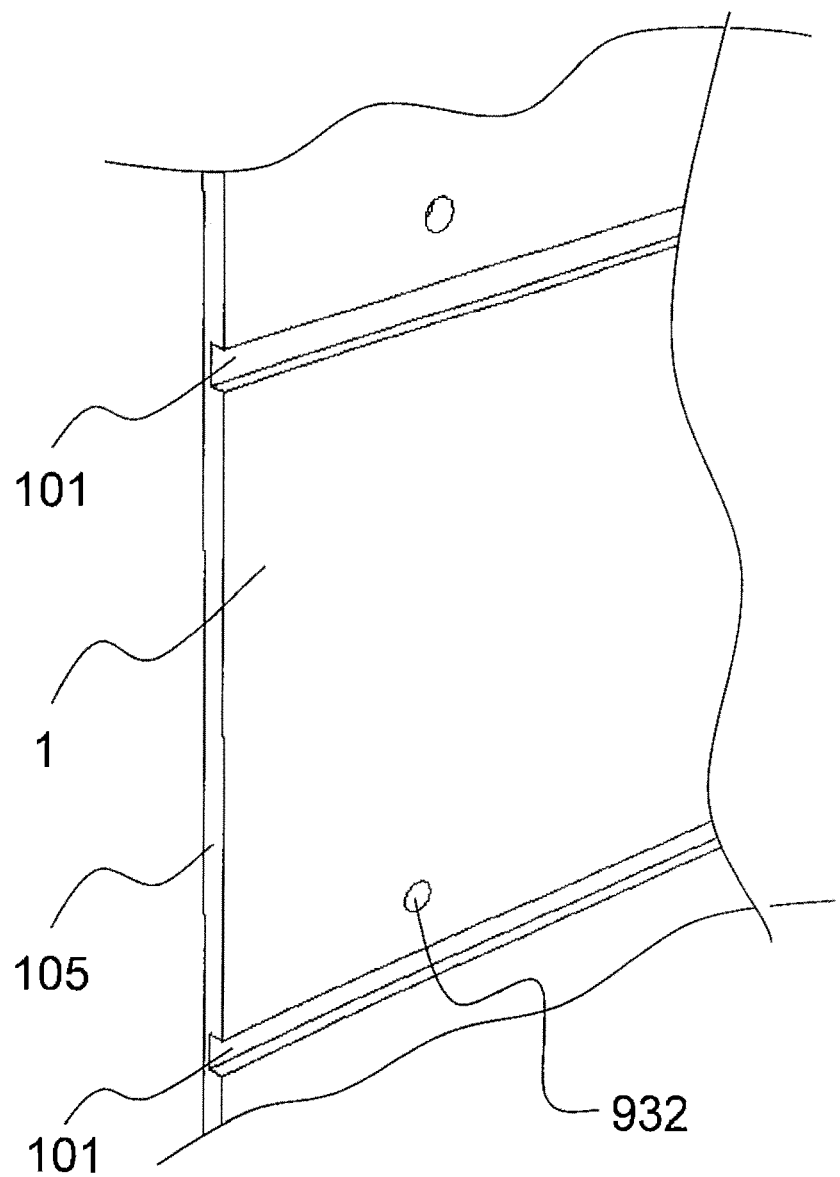

FIGS. 6A and 6B are perspective views illustrating an example of the outer shape of the light guide plate 1 shown in FIG. 1, FIG. 4, and the like. FIG. 6A illustrates the rear side (the side on which the groove portion 101 is formed) of the light guide plate 1, and FIG. 6B illustrates an enlarged view of the end of the light guide plate 1.

As illustrated in FIG. 6A, the light guide plate 1 according to the embodiment comprises one tabular light guide plate having substantially the same size as the display surface of the liquid crystal display panel. Moreover, on the rear side thereof, as illustrated in FIG. 6B, a plurality of groove portions 101, which are formed continuously from one end 105 in the horizontal direction of the light guide plate 1 to the other end, are provided in parallel. In this example, seven groove portions 101 are assumed to be provided. Here, the groove portion 101 is assumed to be formed also in the lowermost end of the light guide plate 1. A plurality of LEDs 2 are inserted into each groove portion 101, and the LEDs 2 of each groove are configured so that the light intensity thereof is individually controlled, respectively. Moreover, a plurality of LEDs 2 inserted into each groove portion 101 are also divided into a plurality of groups. For example, when the number of LEDs inserted into one groove portion 101 is 30, these are divided into 10 groups, each group having three LEDs, and these groups are configured so that LEDs of each group are individually controlled, respectively. Accordingly, in this example, the light guide plate 1 is divided into a total of 70 (virtual) regions of 7×10. This region is the minimum unit in which the intensity of light is controlled, and the light intensity (i.e., the light intensity of LEDs corresponding to each region; the light intensity of three LEDs in this case) of each region is controlled in accordance with the brightness of a video signal corresponding to each region. This enables the so-called areal control (local dimming).

Moreover, a plurality of light guide plate holes 932, into each of which the pin mould 70 for attaching the illumination board 10 is inserted, are provided in the light guide plate 1.

Figure 7:
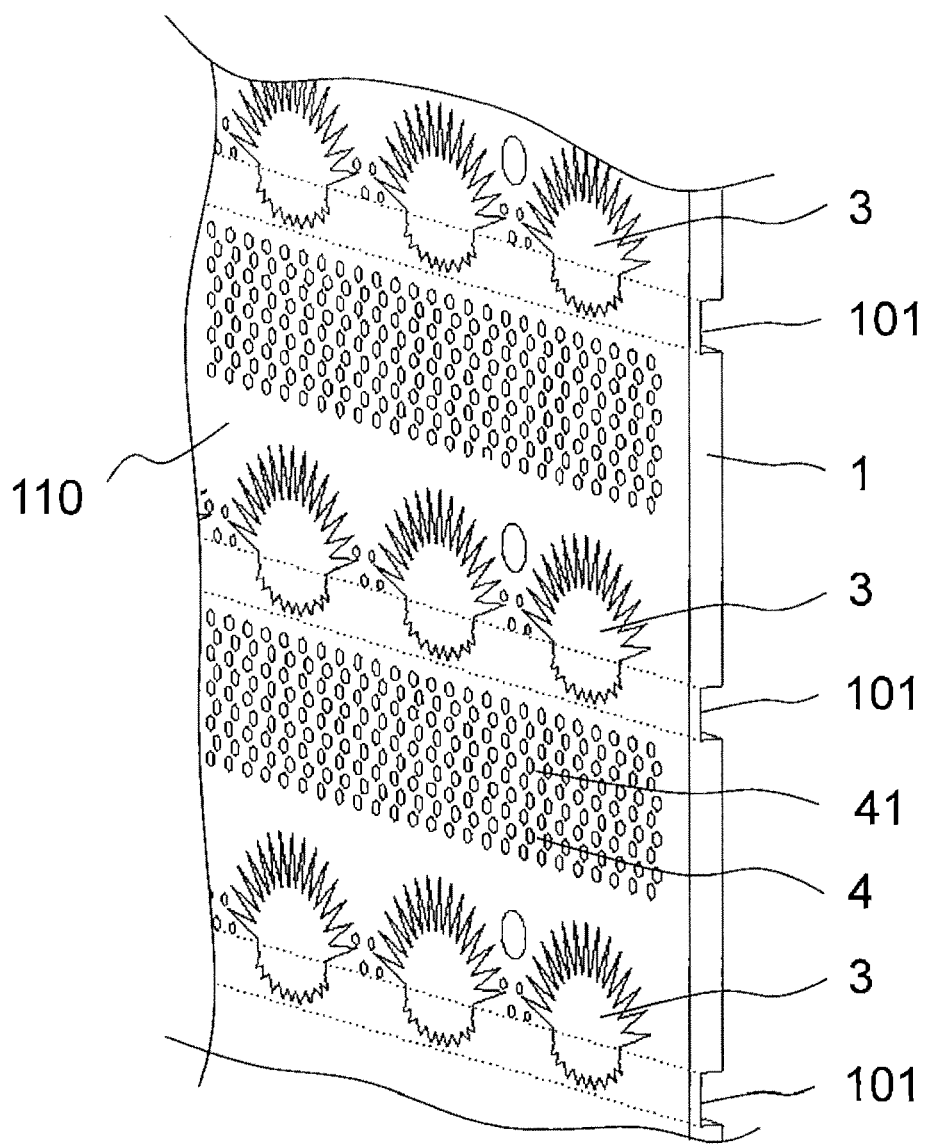
FIG. 7 is a perspective view illustrating a dimming pattern and a light guide pattern formed on the light emitting surface of a light guide plate according to the first embodiment of the present invention.

FIG. 7 is a view illustrating the configuration on the light emitting surface 110 side of the light guide plate 1 according to the first embodiment of the present invention. As illustrated in FIG. 7, on the light emitting surface 110 side of the light guide plate 1, the chestnut-shaped dimming pattern 3 and the light guide pattern 4 comprising a collection of micro-dots 41 are provided. The location of the dimming pattern 3 is set corresponding to the location of the LED 2 housed in the groove portion 101 provided on the light incident surface side of the light guide plate 1. The dimming pattern 3 and the light guide pattern 4 each have a different transmittance and diffusivity of light, and are provided by printing or the like. The detail of each pattern is described below.

The dimming pattern 3 is provided at a portion directly above the LED 2 inside the groove portion 101 on the light emitting surface 110 of the tabular light guide plate 1, as illustrated in FIG. 1, and includes: a main portion 33 located directly above the LED 2 and covering the center of the LED 2; a radial emission-side protrusion 31 extending from the center of the LED 2 to the light emitting side of the LED 2; and a radial rear-side protrusion 32 extending to the rear side (the opposite side of the light emitting side) of the LED 2.

Because the main portion 33 forms an elliptic shape with the direction perpendicular to the light emitting direction of light as a long axis, the main portion 33 will be referred to as the elliptic portion 33. However, the main portion 33 may not be elliptic but may be circular. Moreover, the emission-side protrusion 31 and the rear-side protrusion 32 each have a tapered shape that gradually narrows with the distance from the LED 2 or the elliptic portion 33.

In the embodiment, the elliptic portion 33, the emission-side protrusion 31, and the rear-side protrusion 32 are connected to each other and integrated. Moreover, the dimming pattern 3 has an optical effect to reflect a part of light incident upon the dimming pattern 3 and cause a part thereof to transmit therethrough as described later, thereby reducing the intensity of light passing through the dimming pattern 3. The transmittance of the dimming pattern 3 is set to approximately 5% to 10% and the reflectance is set to 80% to 90%, for example.

As described above, the LED 2 is provided in the groove portion 101, and light exiting from the LED 2 is incident upon the light incident surface 102 of the light guide plate 1, and travels inside the light guide plate 1. Here, as the LED 2, the side view type LED is used as described above, however, even with the side view type LED, light transmits through the upper side of a package constituting the contour of the LED and travels toward directly above the LED 2. Moreover, the light reflected by the light incident surface 102 of the groove portion 101 travels toward directly above the LED 2. With such light, in the portion directly above the LED 2 of the light emitting surface 110 of the light guide plate 1, the light intensity locally increases as compared with in other portions. Hereinafter, this portion where the light intensity locally increases is referred to as an "optical spot." Because the light from the LED 2 radially spreads toward the light emitting direction, the optical spot will also have a radially spreading shape.

Then, in the embodiment, in the light incident surface 102 of the light guide plate 1, the dimming pattern 3 comprises a combination of the elliptic portion 33 covering particularly the portion directly above the LED 2, where the optical spot is generated, and the emission-side protrusion 31 radially extending toward the light emitting direction. Thus, the intensity of light exiting from the light incident surface 102 toward directly above the LED 2 and the intensity of light radially spreading toward the light emitting direction therefrom are weakened to reduce the brightness of the optical spot.

Moreover, because the light turns around also to the rear side (the opposite side of the light emitting surface) of the LED 2, the optical spot slightly radially spreads also in the rear-surface direction of the LED 2. Therefore, in the embodiment, by further providing the radial rear-side protrusion 32 extending to the rear side of the LED 2 as the dimming pattern 3, the light intensity of the rear side portion of the LED 2 in the light incident surface 102 of the light guide plate 1 can be weakened.

That is, the embodiment reduces the optical spot and suitably suppresses the uneven brightness by using the dimming pattern 3 with a shape taking into consideration the light emission characteristic of the LED 2. Hereinafter, the detail of the optical effect of the dimming pattern 3 is described.

In the elliptic portion 33 in the center of the dimming pattern 3, the light emitted from the LED 2 is dimmed and reflected. In the vicinity of the neighboring radial emission-side protrusion 31, in a portion where the protrusion is formed, the light emitted from the LED 2 is dimmed and reflected as with the above-described elliptic portion, while in the space between the protrusions, i.e., a portion where the protrusion is not formed, corresponding to the valley between the protrusions, the light from the LED 2 is transmitted therethrough and emitted to the outside of the light guide plate 1. That is, in the vicinity of the radial emission-side protrusion 31, a different optical effect of extinction/reflection/transmission is provided depending on each location, and the quantity of light emitted from the light guide plate 1 as a whole is gradually varied and controlled by the shape of the emission-side protrusion 31. Moreover, for the portion of the light that is emitted from the LED 2 and turns around and travels to the rear side, by means of the radial rear-side protrusion 32, as with the above-described emission-side protrusion 31, a different optical effect of extinction/reflection/transmission is provided depending on each location, thereby gradually varying the quantity of light emitted from the light guide plate 1. Here, because the emission-side protrusion 31 is formed longer than the rear-side protrusion 32, the range, in which the optical effect of the above-described extinction/reflection/transmission is provided, is larger in the emission-side protrusion 31 (that is, on the light emitting direction side of the LED 2).

(B) of FIG. 1 is a cross sectional view for illustrating the optical effect around the LED 2. Here, for example, the optical effect provided to a light beam A51 is described. The light beam 51 emitted from the LED 2 travels into the light guide plate 1 through the light incident surface 102, and reaches the dimming pattern 3 provided on the light emitting surface 110 of the light guide plate 1. Here, the light beam 51 splits into two beams: a light beam 52 which travels inside the dimming pattern 3 and the light quantity of which is attenuated inside the dimming pattern 3 and which exits from the light guide plate 1; and a light beam 53 that is reflected by the dimming pattern 3 and returns into the light guide plate 1. Furthermore, the light beam 53 transmits through a reflective surface 111 formed in the rear surface of the light guide plate 1, and is diffused and reflected by the reflective sheet 920, and splits into a light beam 55 and a diffused light beam 54. The diffused light beam 54 is a light beam diffused and reflected by the reflective sheet 920, and enters the light guide plate 1 with an incident angle lower than the light beam 55. The light beam 55 travels inside the light guide plate 1 again, and is reflected by the radial emission-side protrusion 31 of the dimming pattern 3, and splits into a light beam 57 returning to the light guide plate 1 and a light beam 56 attenuating and transmitting and propagating to the outside of the light guide plate 1.

Next, an optical effect provided to the light beam 58 having the angle of emergence with respect to the optical axis smaller than the light beam 51 is described. The light beam 58 travels inside the light guide plate 1, and is reflected by or transmits through the dimming pattern 3, and splits into a light beam 60 that has dimmed and transmitted therethrough and a light beam 59 that has been reflected. Furthermore, the light beam 59 is totally reflected on the reflective surface 111 side of the light guide plate 1 because the incident angle is equal to or less than a critical angle, and travels inside the light guide plate 1 as shown by a light beam 61, and then travels from the light emitting surface to the outside of the light guide plate at a non-illustrated location.

A light beam 62, the angle of emergence of which with respect to the optical axis is further smaller than the light beam 51, travels to a location (location far from the LED 2) ahead of a location where the dimming pattern 3 of the light emitting surface 110 of the light guide plate 1 is formed. In this case, the incident angle with respect to the light emitting surface 110 becomes equal to or less than the critical angle, and the light beam 62 is totally reflected by the light emitting surface 110, and travels further into the light guide plate as shown by a light beam 63, and then transmits through the light emitting surface 110 at a non-illustrated location and travels to the outside of the light guide plate 1.

(C) of FIG. 1 illustrates how a light beam behaves in the valley portion (the portion between protrusions) of the emission-side protrusion 31 of the dimming pattern 3 described in (b) of FIG. 1. A light beam 66 that has traveled to the vicinity of the dimming pattern 3 with an angle similar to the light beam 58 described in (b) of FIG. 1 travels to the valley of the emission-side protrusion 31 of the dimming pattern 3. In this case, on the light emitting surface 110 to which the light beam 66 travels, the dimming pattern 3 is not provided and the incident angle does not reach the critical angle, and therefore, the light beam 66 transmits through the light emitting surface 110 and travels to the outside of the light guide plate 1.

In this manner, in the embodiment, with the use of the dimming pattern 3 having a shape corresponding to the light emission characteristic of the LED 2, i.e., the light pattern with the radially-formed emission-side protrusions 31, the uneven brightness can be blurred in two dimensions by causing the light emitted from the LED 2 to transmit therethrough without dimming the light or by gradually varying the percentage of the portion to dim.

Figure 8:
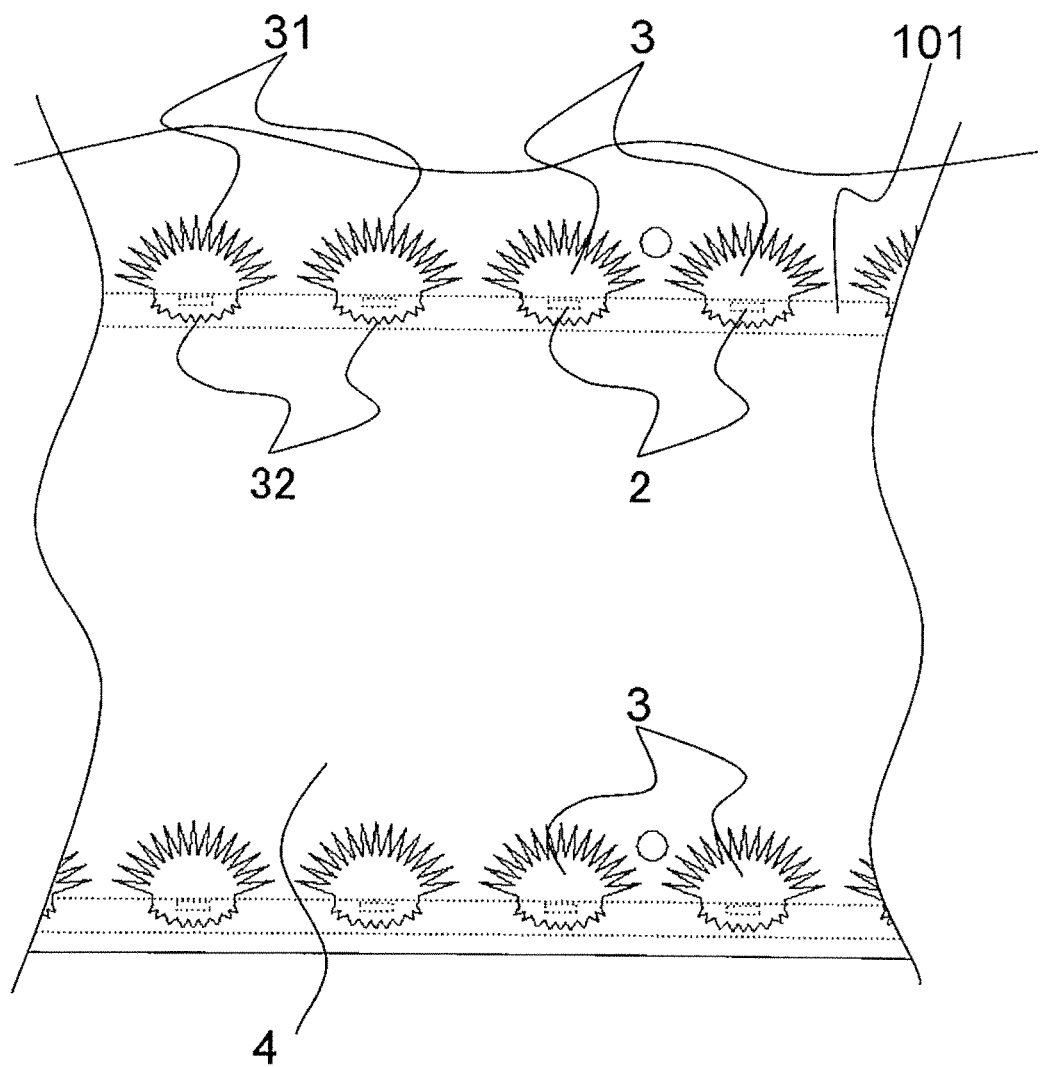
FIG. 8 is a view illustrating an example of the dimming pattern according to the first embodiment of the present invention.

FIG. 8 illustrates an example of the arrangement of the dimming pattern 3 among the patterns described in FIG. 1. As illustrated in FIG. 8, the LED 2 is arranged in rows along the longer direction of a plurality of groove portions 101, and the dimming pattern 3 is arranged in rows at portions corresponding to the location of the LED 2 of the light emitting surface 101, along the longer direction of the groove portion 101. That is, the arrangement pitch of the LED 2 agrees with the arrangement pitch of the dimming pattern 3.

Next, a light guide pattern 4 that is a pattern different from the dimming pattern 3 illustrated in FIG. 1 is described with reference to FIG. 9.

Figure 9:
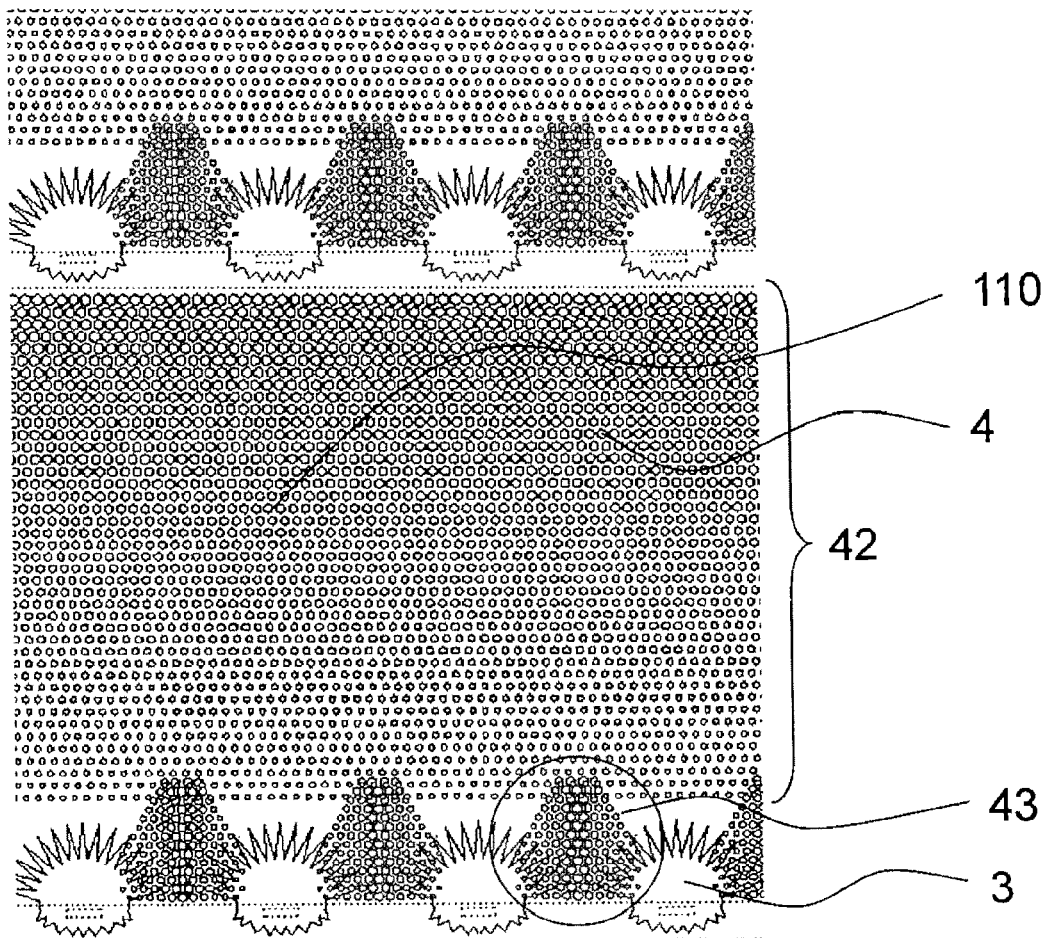
FIG. 9 is a view illustrating an example of the light guide pattern and the dimming pattern formed on the light emitting surface of the light guide plate according to the first embodiment of the present invention.

As illustrated in FIG. 9, on the light emitting surface 110 side of the light guide plate 1, the dimming pattern 3 provided in the vicinity of the LED 2 is present, and the light guide pattern 4 is provided with a predetermined spacing, in the light emitting direction of the LED 2, from the dimming pattern 3. Because the light guide pattern 4 uniforms the light emitted from the light emitting surface 110, the light guide pattern 4 will be referred to as an in-plane uniforming pattern. Moreover, in the embodiment, apart from the in-plane uniforming pattern 42, an additional light guide pattern 43 is provided at a location corresponding to the portion between LEDs 2. Because the additional light guide pattern 43 reduces the reduction in the brightness in between LEDs and uniforms the light emitted from the light emitting surface 110 in a region where a plurality of LEDs 2 are provided, the additional light guide pattern 43 will be referred to as an inter-LED uniforming pattern.

First, the in-plane uniforming pattern 42 extracts the light, which exits from the LED 2 and travels inside the light guide plate 1 by total internal reflection, from the light guide plate 1 to the outside by causing the light not to satisfy some of the total internal reflection conditions. That is, by providing the in-plane uniforming pattern 42, the total internal reflection conditions in a portion, where the pattern 42 is provided, of the light emitting surface 110 is varied, and the quantity of light being totally reflected by this portion and returning to the inside of the light guide plate 1 is increased more than the quantity of light transmitting therethrough. At this time, by sequentially varying the shape of the pattern (dot) and the spacing between the patterns (dots) in accordance with the distance from the LED 2, the quantity of light (light transmitting through the light emitting surface 110) to extract can be uniformed in the plane. For example, the density of dots is made denser as the distance from the LED 2 increases, or the size of the dot is made larger as the distance from the LED 2 increases. In this manner, the further from the LED 2, the larger the percentage to extract light becomes, and a reduction in brightness at a location further away from the LED 2 can be suppressed.

Next, in the inter-LED uniforming pattern 43, for lateral light exiting from the LED 2, by facilitating the extraction of the lateral light between LEDs 2, a dark portion between LEDs can be corrected and made bright. Also in the inter-LED uniforming pattern 43, the density of dots constituting the pattern 43 is increased with the distance from the LED 2, that is as approaching the middle between LEDs 2, and also the size of the dot is made larger as approaching the middle between LEDs 2. The inter-LED uniforming pattern 43, as illustrated, forms a substantially triangular shape which, seen from the light emitting side, is tapered toward the light emitting direction of the LED 2. Such a shape is employed because the light emission characteristic from the LED 2 is radial around the optical axis of the LED 2 and therefore the area of a dark portion between LEDs 2 decreases in the light emitting direction of the LED 2.

With a combination of these two types of light guide patterns in conjunction with the above-described dimming pattern 3, the quantity of light emitted from the light guide plate 1 can be uniformed in the plane.

Thus, according to the embodiment, an illumination apparatus reducing the intensity of the optical spot formed in the vicinity of the LED 2 and reducing the uneven brightness can be provided. Furthermore, in a display apparatus applying this illumination apparatus, a high-quality image with a uniform brightness can be displayed.

Embodiment 2

Figure 10B:
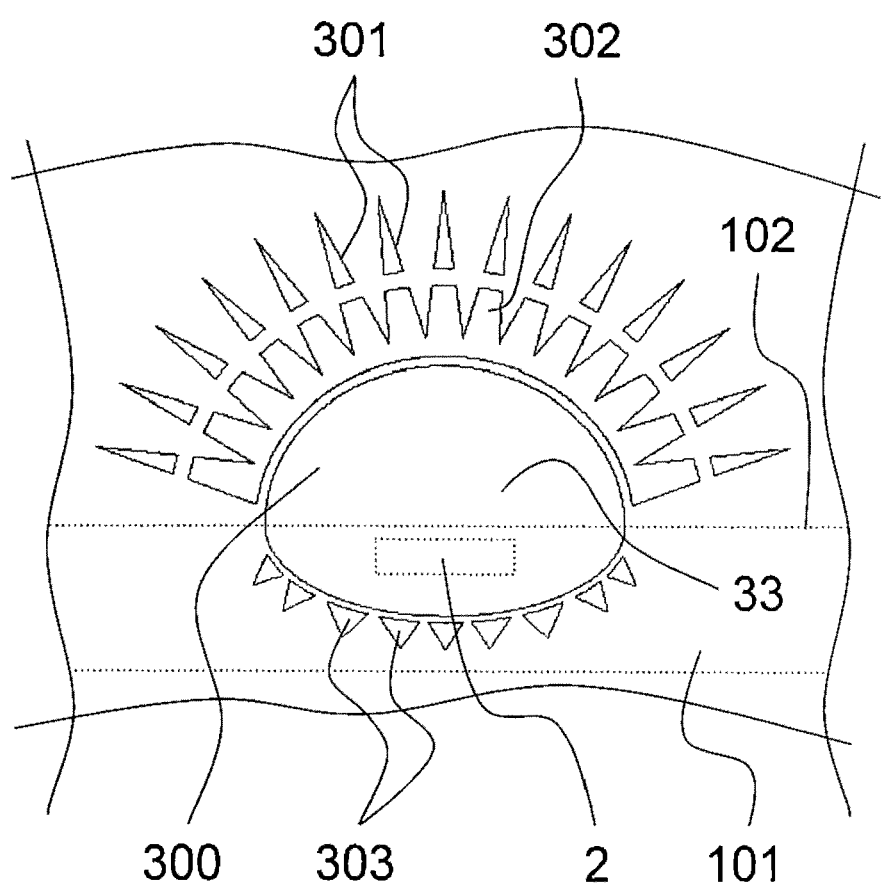

Next, a second embodiment of the present invention is described with reference to FIGS. 10A and 10B. The embodiment is the same as the first embodiment in that the LED 2 and the dimming pattern are arranged along the longer direction of a plurality of groove portions 101 as illustrated in FIG. 10A, however, the shape of the dimming pattern differs. A dimming pattern 300 according to the embodiment, as illustrated in FIG. 10A, comprises an elliptic portion 33 covering the LED 2 on the light emitting surface 110 side, emission-side tip protrusions 301 radially extending to the light-emitting side around the location of the LED 2, intermediate protrusions 302 radially extending to the light-emitting side around the location of the LED 2, and rear-side protrusions 303 radially extending to the rear side around the location of the LED 2, and these portions suppress the uneven brightness. In this manner, as with the first embodiment described in FIG. 1, the optical spot is reduced, and in the vicinity of the LED 2 the light emitted from the LED 2 is uniformly emitted by means of the dimming pattern.

In the first embodiment described above, the respective portions of the dimming pattern 3 are integrally formed, while in the embodiment, as illustrated in FIG. 10B, the elliptic portion 33, the radial intermediate protrusions 302, the radial emission-side tip protrusions 301, and the radial rear-side protrusions 303 are separated from each other. That is, the respective portions of the dimming pattern 300 are physically separated from each other. Moreover, each protrusion comprises a combination of a triangle and a trapezoid that are radially arranged around the LED 2. By constituting in this manner, the quantity of emission of light from the space between the respective portions of the light pattern 300 is increased, and by providing the dimming pattern, the extreme darkness in the vicinity of the LED 2 can be suppressed and the uneven brightness in the vicinity of the LED 2 can be suppressed more suitably.

In the second embodiment, the emission-side tip protrusion 301 and the intermediate protrusion 302 are separated from each other, however these portions may be integrated.

Embodiment 3

Next, a third embodiment of the present invention is described with reference to FIGS. 11A and 11B. The embodiment is also the same as the first embodiment and the second embodiment in that the LED 2 and the dimming pattern are arranged along the longer direction of a plurality of groove portions 101 as illustrated in FIG. 11A, however, the shape of the dimming pattern, in particular, the shape of the emission-side protrusion and the rear-side protrusion, differ.

Figure 11A:
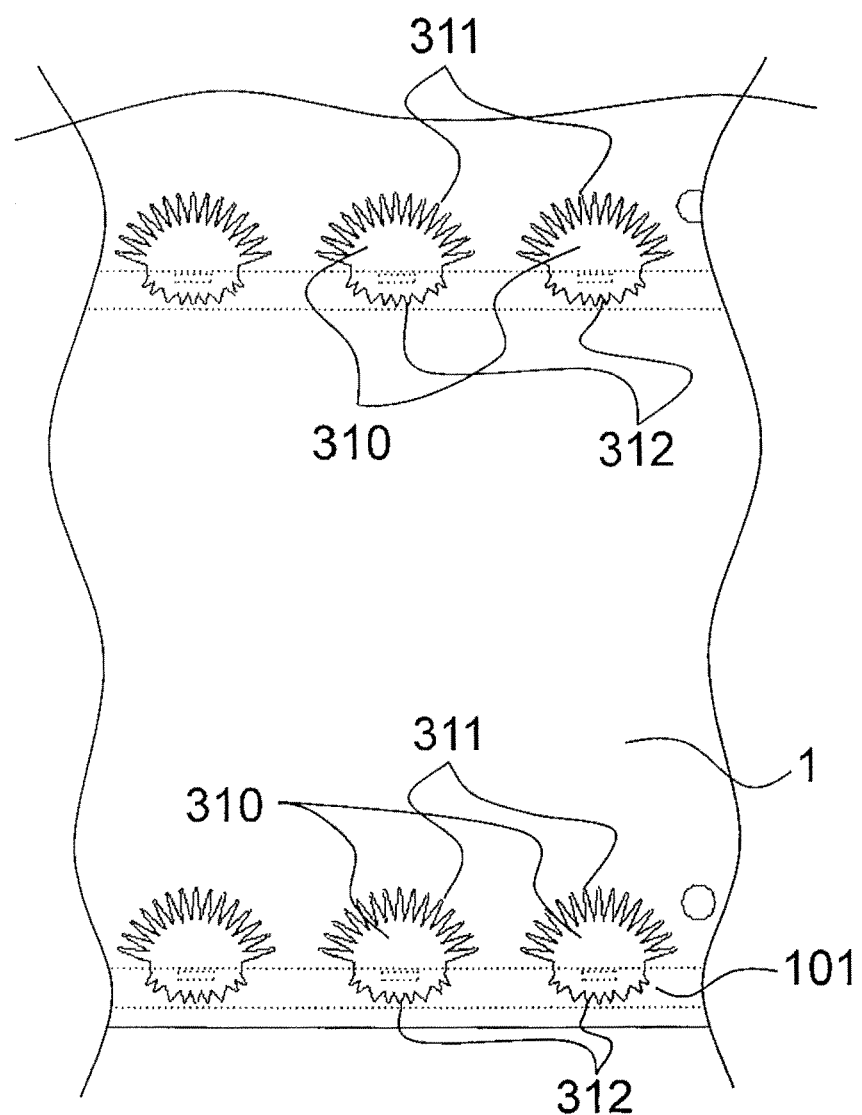
FIGS. 11A and 11B are views illustrating a third embodiment of the present invention.
Figure 11B:
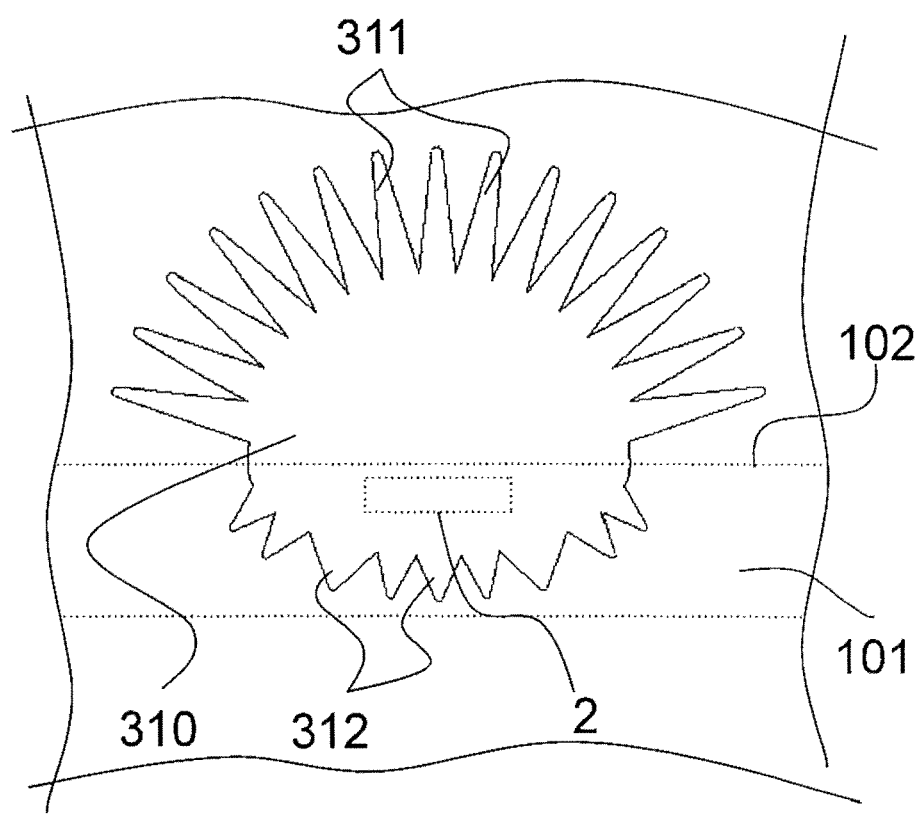

A dimming pattern 310 according to the embodiment, as illustrated in FIGS. 11A and 11B, comprises the elliptic portion 33 covering the LED 2 on the light emitting surface 110 side, emission-side protrusions 311 radially extending to the light-emitting side around the location of the LED 2, and rear-side protrusions 312 radially extending to the rear side around the location of the LED 2, and these portions suppress the uneven brightness. In this manner, as with the first embodiment described in FIG. 1, the optical spots are reduced, and in the vicinity of the LED 2 the light emitted from the LED 2 is uniformly emitted by means of the dimming pattern.

In the above-described first embodiment, the emission-side protrusion 31 and the rear-side protrusion 32 of the dimming pattern 3 form a triangular shape, while in the dimming pattern 310 according to the embodiment, the emission-side protrusion 311 and the rear-side protrusion 312 are substantially trapezoidal or have a tip rounded with a radius of curvature R, as illustrated in FIG. 11B. With such an arrangement, the concentration of light due to the fact that the tip of the protrusion is pointed can be moderated, and the uneven brightness in the vicinity of the LED 2 can be suppressed more suitably.

Embodiment 4

Next, a fourth embodiment of the present invention is described with reference to FIGS. 12A and 12B.

The embodiment is also the same as the first to third embodiments in that the LEDs 2 and dimming patterns 320 are arranged along the longer direction of a plurality of groove portions 101 as illustrated in FIG. 12A, but the shape of the dimming pattern, in particular the shape of the emission-side protrusion and the rear-side protrusion, differ.

Figure 12B:
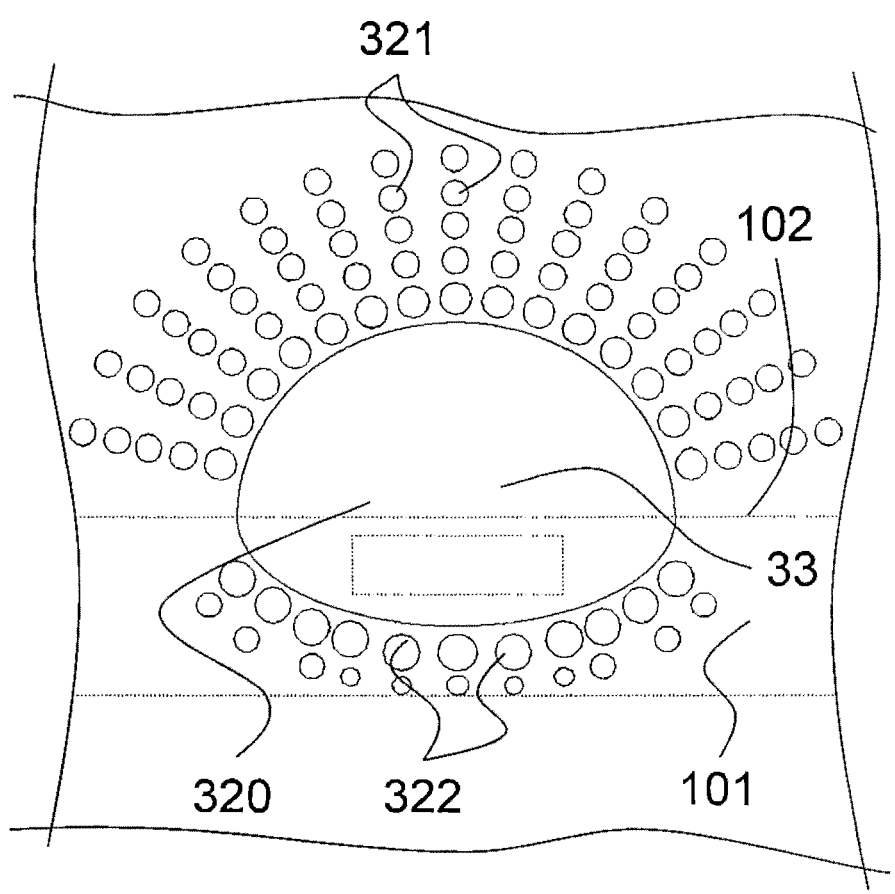

The dimming pattern 320 according to the embodiment comprises, as illustrated in FIG. 12B, the elliptic portion 33 covering the LED 2 on the light emitting surface 110 side, a emission-side protrusion 321 radially extending to the light-emitting side around the location of the LED 2, and a rear-side protrusion 322 radially extending to the rear side around the location of the LED 2, and these portions suppress the uneven brightness. In this manner, as with the first embodiment described in FIG. 1, the optical spot is reduced, and in the vicinity of the LED 2 light emitted from the LED 2 is uniformly emitted by means of the dimming pattern.

In the above-described first to third embodiments, the emission-side protrusion and the rear-side protrusion form a triangular or trapezoid shape, while in the embodiment, as illustrated in FIG. 12B, the emission-side protrusion 321 and the rear-side protrusion 322 comprise a collection of micro circular dots. The embodiment is the same as the first to third embodiments in having the elliptic portion 33 covering the LED 2 on the light emitting surface 110 side.

The size of the plurality of dots constituting the emission-side protrusion 321 and the rear-side protrusion 322 is the largest at a location near the LED 2 (the elliptic portion 33) and is small at a location away from the LED 2 or the elliptic portion 33. In FIG. 12B, the size of dots other than the dots at the location closest to the LED 2 or the elliptic portion 33 are the same, respectively, however, the size of the dot may be gradually reduced with the distance from the LED 2 or the elliptic portion 33.

With such a configuration, the pointed portion in the dimming pattern 322 is eliminated and the concentration of light is further moderated than the third embodiment, and as with the second embodiment, the extreme darkness in the vicinity of the LED 2 can be suppressed by means of the dimming pattern. Accordingly, with the embodiment, the uneven brightness in the vicinity of the LED 2 can be suppressed more suitably.

Embodiment 5

Next, a fifth embodiment of the present invention is described with reference to FIGS. 13A and 13B.

The embodiment is also the same as the first to fourth embodiments in that the LEDs 2 and dimming patterns are arranged along the longer direction of a plurality of groove portions 101 as illustrated in FIG. 13A, however, the shape of the dimming pattern, in particular the emission-side protrusion, differs.

Figure 13B:
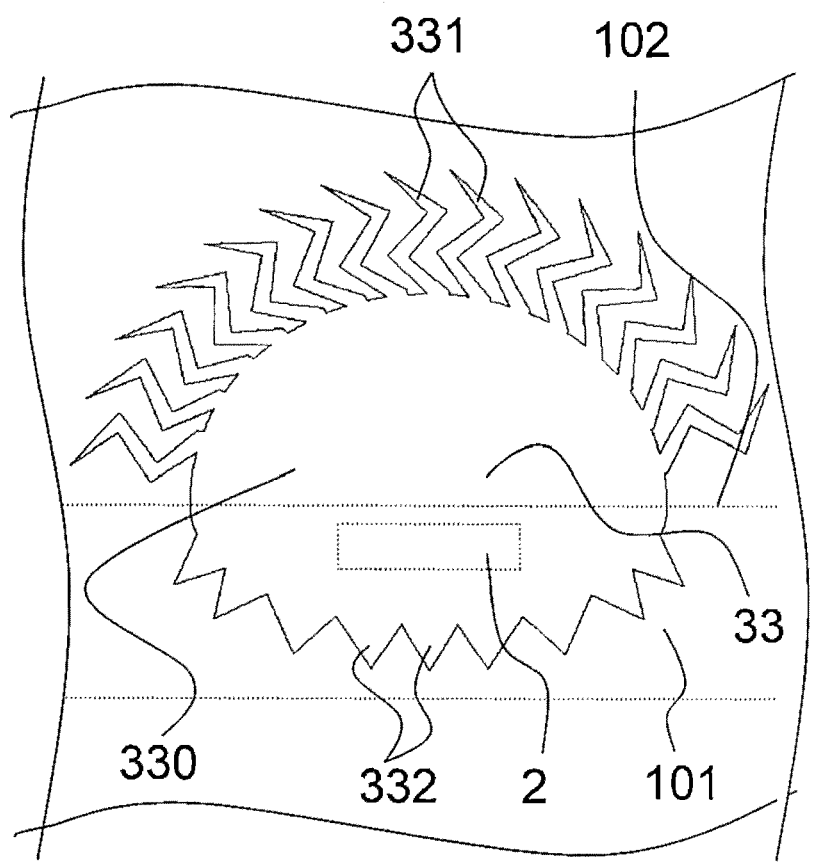

A dimming pattern 330 according to the embodiment comprises, as illustrated in FIGS. 13A and 13B, the elliptic portion 33 covering the LED 2 on the light emitting surface 110 side, a emission-side protrusion 331 radially extending to the light-emitting side around the location of the LED 2, and a rear-side protrusion 332 radially extending to the rear side around the location of the LED 2, and these portions suppress the uneven brightness. In this manner, as with the first embodiment described in FIG. 1, the optical spot is reduced, and in the vicinity of the LED 2 the light emitted from the LED 2 is uniformly emitted by means of the dimming pattern.

In the above-described first to fourth embodiments, the emission-side protrusion and the rear-side protrusion form a triangular or trapezoid shape, or a collection of circular dots, while in the embodiment, as illustrated in FIG. 13B, the emission-side protrusion 331 forms a zigzag key shape. Even with such a shape, the uneven brightness in the vicinity of the LED 2 can be suppressed.

As described above, according to the embodiments, the light emitted from the light guide plate in the vicinity of an LED can be uniformed. That is, according to the embodiments, a stable performance illumination unit and display apparatus with reduced uneven brightness can be provided, and accordingly a stable performance display apparatus can be provided.

In the description of the embodiments, as the method of forming the dimming pattern or the light guide pattern provided in the light guide plate, methods by printing, coating, or the like have been described. However, it is needless to say that even with other methods, such as ink-jet printing, flexo printing, heat-transfer printing, or pattern formation using an electrostatic adsorption method (the so-called electrophotographic method), the same effect can be obtained.

Moreover, the length of the protrusion in the emission-side protrusion and in the rear-side protrusion, respectively, is the same in one dimming pattern but may differ. For example, the smaller the angle between the optical axis of an LED and the emission-side protrusion, the longer the length of the protrusion may be set, while the larger the angle between the optical axis of an LED and the emission-side protrusion, the shorter the length of the protrusion may be set.

In the description of the embodiments, the LED has been described with the so-called "side view type LED" taken as an example, however, it is needless to say that even a top view type LED (with an upward emission configuration) can be similarly constructed and the same effect can be obtained.

The invention claimed is:

1. An illumination unit, comprising a light emitting element as a light source and a tabular light guide plate having a light emitting surface for emitting light from the light emitting element as planar light, wherein a recessed portion is formed in an opposite surface of the light emitting surface of the light guide plate, and the light emitting element is provided in the recessed portion so that an optical axis of the light emitting element becomes parallel to the light emitting surface of the light guide plate;
wherein a dimming pattern is provided on the light emitting surface of the light guide plate at a portion positionally corresponding to the light emitting element; and
wherein the dimming pattern includes a main portion covering the light emitting element on the light emitting surface side, and protrusions radially extending toward light emitting directions of the light emitting element around the light emitting element when viewing the light emitting surface of the light guide plate from the light emitting surface side.

2. The illumination unit according to claim 1, wherein the light emitting element is an LED.

3. The illumination unit according to claim 1, wherein the dimming pattern is formed by printing.

4. The illumination unit according to claim 1, wherein the main portion has an elliptic shape with a direction perpendicular to the light emission direction of the light emitting element as a long axis.

5. The illumination unit according to claim 1, wherein a first light guide pattern comprising a collection of dots of the dimming pattern is formed with a predetermined spacing in a light emitting direction of the light emitting element.

6. The illumination unit according to claim 5, wherein a plurality of the light emitting elements are arranged along a longer direction of the recessed portion, and wherein a second light guide pattern comprising a collection of dots is formed between the light emitting elements.

7. The illumination unit according to claim 1, wherein a plurality of the light emitting elements are arranged along a longer direction of the recessed portion, and wherein a second light guide pattern comprising a collection of dots is formed between the light emitting elements.

8. A display apparatus using the illumination unit according to claim 1 as a back light.

9. An illumination unit, comprising a light emitting element as a light source and a tabular light guide plate having a light emitting surface for emitting light from the light emitting element as a planar light, wherein a recessed portion is formed in an opposite surface of the light emitting surface of the light guide plate, and the light emitting element is provided in the recessed portion so that an optical axis of the light emitting element becomes parallel to the light emitting surface of the light guide plate;
wherein a dimming pattern is provided on the light emitting surface of the light guide plate at a portion positionally corresponding to the light emitting element;

wherein the dimming pattern includes a main portion covering the light emitting element on the light emitting surface side, and protrusions radially extending toward light emitting directions of the light emitting element around the light emitting element when viewing the light emitting surface of the light guide plate from the light emitting surface side; and wherein the dimming pattern further includes second protrusions radially extending toward directions opposite to the light emitting side of the light emitting element.

10. The illumination unit according to claim 9, wherein the first protrusion and the second protrusion have a tapered shape that narrows with the distance from the light emitting element.

11. The illumination unit according to claim 9, wherein the protrusion and the second protrusion are integrally constructed with the main portion.

12. The illumination unit according to claim 9, wherein the protrusion and the second protrusion are provided separately from the main portion.

13. The illumination unit according to claim 9, wherein the protrusion and the second protrusion have a trapezoidal or a rounded tip shape.

14. The illumination unit according to claim 9, wherein the projection portion and the second projection portion comprise a plurality of circular dots.

15. The illumination unit according to claim 9, wherein the projection portion and the second projection portion have a key shape.

* * * * *